United States Patent
Kumagai

Patent Number: 5,621,823
Date of Patent: Apr. 15, 1997

[54] IMAGE PROCESSING METHOD FOR THINNING LINES USING INDEX VALUES

[75] Inventor: Ryohei Kumagai, Tokyo, Japan

[73] Assignees: Yozan, Inc., Tokyo; Sharp Corporation, Osaka, both of Japan

[21] Appl. No.: 3,861

[22] Filed: Jan. 8, 1993

Related U.S. Application Data

[63] Continuation of Ser. No. 759,655, Sep. 13, 1991, abandoned, which is a continuation of Ser. No. 292,349, Dec. 30, 1988, abandoned.

[51] Int. Cl.⁶ .................................................. G06K 9/44
[52] U.S. Cl. ............................................ 382/259; 382/109
[58] Field of Search .................................. 382/51, 54, 55

[56] References Cited

U.S. PATENT DOCUMENTS

| | | | |
|---|---|---|---|
| 4,204,232 | 5/1980 | Mizuno | 382/55 |
| 4,539,704 | 9/1985 | Pastor et al. | 382/55 |
| 4,574,357 | 3/1986 | Pastor et al. | 364/518 |
| 4,665,441 | 5/1987 | Sakaue et al. | 358/280 |
| 4,703,363 | 10/1987 | Kitamura | 382/55 |
| 4,783,840 | 11/1988 | Song | 382/54 |
| 4,949,390 | 8/1990 | Iverson et al. | 382/55 |
| 5,170,444 | 12/1992 | Yamanaka | 382/55 |

OTHER PUBLICATIONS

Paul C. K. Kowk, A Thinning Algorithm by Contour Generation, Communications of the ACM, Nov. 1988 vol. 31, No. 11, pp. 1314–1324.

C. L. Lawson, Editor, Thinning Algorithms on Rectangular, Hexagonal, and Triangular Arrays, E.S. Deutsch, Univeristy of Maryland, Scientific Applications, Association for Computing Machiner, Inc., 1972.

Paul C.K. Kowk, A Thinning Algorithm by Contour Generation, Communications of the ACM, Nov. 1988, vol. 31, No. 11, pp. 1314–1324.

E.S. Deutsch, Thinning Algorithms on Rectangular, Hexagonal, and Triangular Arrays, Communications of the ACM, Scientific Applications, Sep. 1972, vol. 15, No. 9.

*Primary Examiner*—Leo Boudreau
*Assistant Examiner*—D. Richard Anderson, Jr.
*Attorney, Agent, or Firm*—Cushman, Darby & Cushman IP Group of Pillsbury Madison & Sutro LLP

[57] ABSTRACT

An image processing method for thinning lines converts pixels having a density of a configuration to a background density. Pixels are converted according to conditions which include densities of pixels in a neighborhood around a pixel to be processed. Pixels to be converted to the background density are first converted to an index value. Subsequent pixels are evaluated using the index values of adjacent, previously evaluated pixels. Index values are then converted to the background density.

8 Claims, 2 Drawing Sheets

IMAGE PROCESSING METHOD FOR THINNING LINES USING INDEX VALUES

This is a continuation of application Ser. No. 07/759,655, filed Sep. 13, 1991, now abandoned, which, in turn, was a continuation of application Ser. No. 07/292,349, filed Dec. 30, 1988, now abandoned.

BACKGROUND

The present invention relates to a method for thinning lines in an image.

In microscopic images of metal crystals, crystal interfaces appear as lines with widths of more than one pixel. Interface lines should be thinned to aid in analysis of images for properties such as particle size. A thinning process should maintain line continuity, because broken interfaces indicate locations where adjacent particles join. Goals of thinning are:
(1) lines after thinning should have a width of one pixel;
(2) lines after thinning should be positioned substantially in the middle of the original line;
(3) the continuity of an original line should be maintained;
(4) the length of an original line should be substantially maintained;
(5) convex and/or concave portions of lines should not result in spikes after thinning;
(6) the thinned lines should not be deformed at crossing locations.

A thinning method, referred to as the Hilditch method, is known but has disadvantages. The method evaluates connectivity of a center pixel as well as connectivity of neighborhood pixels adjacent to the center pixel. The process result has high quality; however, the process speed is low. It is desirable to use faster processing methods.

SUMMARY OF THE INVENTION

The present invention provides a method for generating images with thinned lines with high process speed and high quality.

Pixels forming a structure in an image, such as interface lines between crystals, are referred to as configuration pixels. They have densities referred to as configuration densities. Other pixels are referred to as background pixels. They have densities referred to as background densities. The thinning method of the present invention selectively converts configuration pixels to background pixels by changing densities of configuration pixels to a background density.

An array of pixels about a center pixel is referred to as a convolution of pixels. The method of the present invention processes pixels in an image in a scanning order, which is the order of a raster scan in the preferred embodiment. For each pixel, the method evaluates a neighborhood of pixels around a center pixel. After the thinning method has processed a first center pixel (which was surrounded by a first set of neighborhood pixels), the method advances to process a second center pixel (which is surrounded by a second set of neighborhood pixels). The change in neighborhoods can be thought of conceptually as shifting a window along a scan line.

In general, a center pixel having a configuration density is converted to a background pixel when it and its neighborhood pixels form a pattern which identifies the center pixel as a boundary pixel. After a number of passes, configurations are thinned to a one-pixel line or a single point.

The method of the present invention utilizes index pixels and avoids artifacts and other undesirable results which sometimes occur. Certain configuration pixels are given density values which are neither a configuration density nor a background density. Subsequent pixels are processed using conditions adapted to account for the presence of index pixels. At the end of a pass, pixels having the index value are converted to the background density.

DETAILED DESCRIPTION OF THE PREFERRED EMBODIMENT

In general, a center pixel having a configuration density is converted to a background pixel when it and its neighborhood pixels form a pattern which identifies the center pixel as a boundary pixel. However, boundary pixels retain their configuration density if they fall within one of a number of exceptions.

Figure 1:
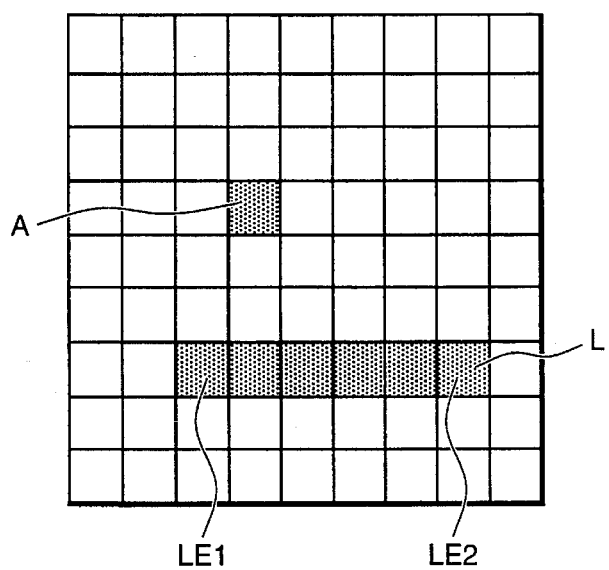
FIG. 1 illustrates an isolated point and a one-pixel line having end points.

FIG. 1 shows two exception for which boundary pixels retain their configuration density after thinning. It is desirable to maintain an isolated, one-pixel point, such as point A. It is also desirable to maintain a line having a width of one pixel, such as line L connecting endpoints LE1 and LE2.

The single point and the one-pixel line are the desired end results after thinning. If a rule results in the conversion of an endpoint to a background density, the one-pixel line will be totally converted and will be extinguished. Therefore, a thinning rule is to maintain isolated points and end points.

Figure 13:
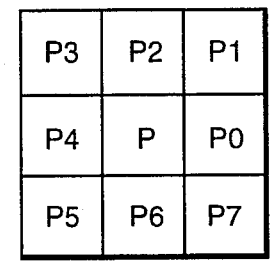
FIG. 13 illustrates a 3×3 convolution with labels for pixel positions referred to for determining connectedness.

Another thinning rule is that juncture pixels connecting a plurality of configurations should not be converted. Pixels having a connectedness of two or greater are considered juncture pixels. Connectedness is defined for a 9 pixel group (a center and eight neighbor pixels) as $N_8$ in the following equation:

$$N_8 = \Sigma(\overline{P_K} - \overline{P_K} P_{K+1} P_{K+2})$$

for: K=0, 2, 4, 6;

$\overline{P_K} = 1 - P_K$; and $P_0 P_8$ are as shown in FIG. 13.

The use of these rules for processing pixels may result in undesirable artifacts or other results when processing certain patterns. It is helpful to understand how the thinning rules cause these artifacts before discussing details of the present invention.

Figure 2:
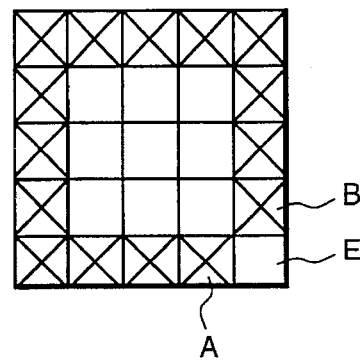
FIG. 2 illustrates a configuration from which a spike can be generated during thinning.

FIG. 2 shows an example of a square configuration which should be thinned to a single point. All pixels of the square have a configuration density, which may be a value of "1", while other pixels have a background density of "0". In one processing pass, it is desired to convert each edge pixel (marked with X) to the background density. After several passes, the configuration will be thinned to a single point.

Figure 3:
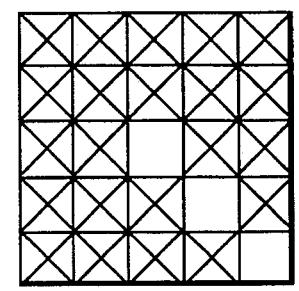
FIG. 3 illustrates a spike generated during thinning of the configuration of FIG. 2.

Application of a rule preserving endpoints results in an undesirable spike, rather than a single point. For example, pixels are processed in raster scan order with a top scan line processed before lower scan lines, and with pixels to the left of a scan line processed before pixels to the right. Boundary pixels of upper lines of the square configuration will be converted before processing the bottom scan line. As the bottom scan line is processed, boundary pixels (such as pixel A) will be converted to the background density. However, when processing advances to the last pixel of the last line (pixel E), the rule preserving endpoints or isolated points lets pixel E remain with a configuration density. In subsequent processing passes, pixels interior to the square configuration will be boundary pixels and will be converted to background pixels. However, the last pixel of lower scan lines will retain the configuration density. The result will be a spike, as shown in FIG. 3.

End points can be processed using parallel processing to avoid spikes. In parallel processing, a new convolution is formed using unconverted pixel values. (In contrast, a serial method forms a new convolution using converted values of a pixel which were formerly processed.) Referring again to FIG. 2, the endpoint pixel E will be evaluated with a neighborhood which includes configuration pixels above it (pixel B) and to its left (pixel A). Pixel E will not satisfy the endpoint condition, and it will be converted to the background density, as are other boundary pixels. Using parallel processing in subsequent passes, interior pixels which might otherwise be preserved as endpoints are converted to background pixels. No spike is formed.

Figure 4A:
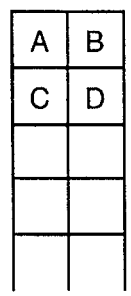
FIG. 4(a) illustrates a two-pixel vertical line which can be eliminated inappropriately during thinning.
Figure 4B:
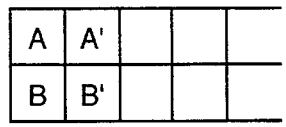
FIG. 4(b) illustrates a two-pixel horizontal line which can be eliminated inappropriately during thinning.

Use of parallel processing for endpoints corrects the problem of spikes but results in undesirable results for other configurations. More particularly, a two-pixel vertical line and a two-pixel horizontal line will be completely converted to background pixels. This is undesirable. Thinning should convert such a two-pixel line to a one-pixel line. FIGS. 4(a) and 4(b) illustrate the problem.

FIG. 4(a) shows a portion of a two-pixel vertical-line configuration. The upper left pixel, A, is neither an isolated point nor an end point (it is adjacent to pixel C on a lower line). Its connectedness is 1 (which indicates that it is not a juncture). Using the rules discussed above, pixel A would be converted to a background density as a boundary pixel. Using parallel processing, pixel B would be evaluated using pixel A as a neighbor with the configuration density. Pixel B would also be converted to a background density, just as Pixel A was. Similarly, Pixels C and D would be converted when the process advances to the second scan line. Eventually, the entire vertical line would be converted to background pixels.

FIG. 4(b) shows a portion of a two-pixel horizontal line. Each upper pixel A, A', . . . has a lower neighbor (B, B', . . . respectively). Each pixel of the upper line is a boundary pixel, but none are endpoints, isolated points or junctures. Each would be converted to the background density. Using parallel processing, each lower pixel B, B', . . . would be evaluated using unconverted densities of the upper line pixels (A, A', . . .). Each lower pixel would be converted to the background density.

The present invention relates to the use index values and avoids the undesirable elimination of two-pixel vertical or horizontal lines. According to the present invention, configuration pixels are converted to an index value which is neither the configuration density nor the background density. Subsequent pixels are processed using conditions adapted to account for the presence of index pixels. At the end of a scan, pixels having the index value are converted to the background density.

Figure 5:
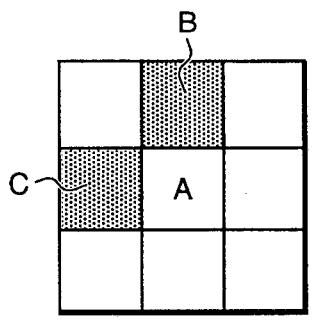
FIG. 5 shows a 3×3 pattern of pixels illustrating a condition (a-i) for converting a center pixel an index value.
Figure 6:
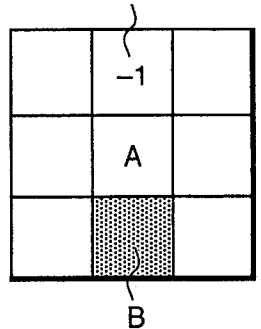
FIG. 6 shows a first 3×3 pattern of pixels illustrating a condition (a-ii) adapted to account for the presence of an index pixel.
Figure 7:
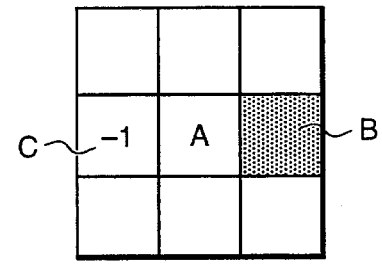
FIG. 7 shows a second 3×3 pattern of pixels illustrating a condition (a-iii) adapted to account for the presence of an index pixel.
Figure 8:
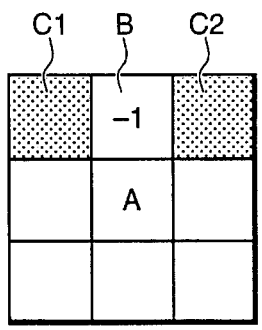
FIG. 8 shows a third 3×3 pattern of pixels illustrating a condition (a-4) adapted to account for the presence of an index pixel.
Figure 9:
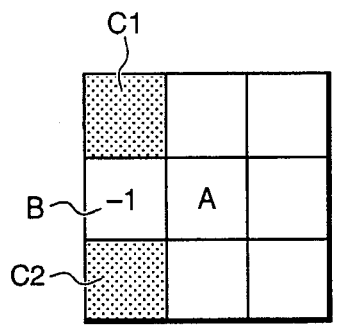
FIG. 9 shows a fourth 3×3 pattern of pixels illustrating a condition (a-v) adapted to account for the presence of an index pixel.

FIGS. 5–9 illustrate a variety of examples of use of index values with 3×3 convolutions of pixels in images in which upper scan lines are processed before lower lines and in which line are processed from left to right. Each figure (5–9) illustrates one of the following conditions (a-i through a-v respectively).

a-i) A center pixel (A) is converted to an index density (−1) when upper and left neighbors (B and C) have background densities as shown in FIG. 5.

a-ii) A center pixel (A) retains its configuration density (as shown in FIG. 6) when:
the center pixel is not processed according to condition a-i);
the upper neighbor (C) has an index density; and
the lower neighbor (B) has a background density after processing.

a-iii) A center pixel (A) retains its configuration density (as shown in FIG. 7) when:
the center pixel is not processed according to conditions a-i) or a-ii);
the left neighbor (C) is an index density; and
the right neighbor is a background density after processing.

a-iv) A center pixel (A) is converted to an index density (as shown if FIG. 8) when:
the center pixel is not processed according to conditions a-i) through a-iii);
the upper neighbor (B) is an index pixel (after processing); and
the upper right and upper left neighbors are background pixels (before processing).

a-v) A center pixel (A) is converted to an index density (as shown if FIG. 9) when:
the center pixel is not processed according to conditions a-i) through a-iv);

the left neighbor (B) is an index density (after processing);

the upper left and lower left neighbors (C1 and C2) are background pixels (before processing).

Figure 10A:
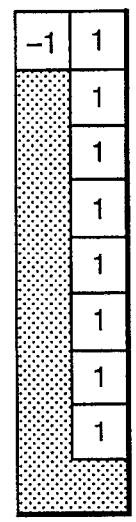
FIG. 10(a) shows a two-pixel vertical line illustrating use of index pixels for thinning.

FIG. 10(a) illustrates an application of conditions a-i) and a-iii). The configuration of FIG. 10(a) is a two-pixel vertical line. The upper left pixel will be converted to the index density (−1) according to condition a-i). The upper right pixel will satisfy condition a-iii) and will maintain its configuration density (1). The left pixel of the second line will be converted as a boundary pixel. The right pixel of the second line will retain its configuration density, because it is now part of a one pixel line. Left pixels of lower lines will be deleted as boundary pixels, while right pixels of lower lines will retain their configuration densities as part of a one pixel line. The bottom two pixels will be deleted—the left as a boundary pixel and the right under a rule (parallel processing) which avoids spikes.

Figure 10B:
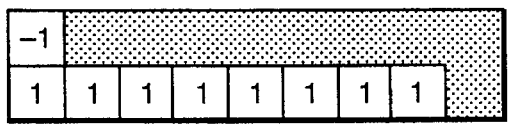
FIG. 10(b) shows a two-pixel horizontal line illustrating use of index pixels for thinning.

FIG. 10(b) illustrates an application of conditions a-i) and a-ii). The configuration of FIG. 10(a) is a two-pixel horizontal line. The upper left pixel will be converted to the index density (−1) according to condition a-i). Other pixels of upper line will be deleted as boundary pixels. When the process advances to the lower line, the left most pixel will satisfy condition a-ii) and retain its configuration density. Other pixels on the lower line will retain their configuration densities as part of a one pixel line. The right-most pixel of the lower line will be deleted under a rule (parallel processing) which avoids spikes.

Figure 11A:
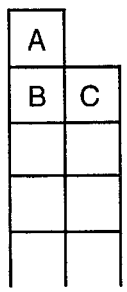
FIG. 11(a) shows a two-pixel vertical line illustrating use of index pixels for thinning.
Figure 12A:
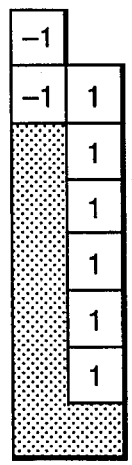
FIG. 12(a) illustrates the result of processing the line of FIG. 11(a) with index pixels.

FIGS. 11(a) and 12(a) illustrates an application of conditions a-i) and a-iv). The configuration of FIG. 11(a) is two-pixel vertical line with the addition of a pixel A to the upper left end. Pixel A would not satisfy conditions as an endpoint and would be converted as a boundary pixel having lower neighbors B and C. Moreover, pixels of the second line (B and C) would be processed as endpoints using parallel processing and the density of A before conversion. Pixels B and C (and all pixels below them) would be converted.

Using index values in accordance with the present invention, the configuration is thinned to a one-pixel line. Pixel A satisfies condition a-i) and is given an index value. Pixel B satisfies condition a-iv) and is also given an index value. Processing continues similarly to the configuration in FIG. 10(a). A one-pixel vertical line is retained as show in FIG. 12(a) with retained configuration pixels marked with the configuration density (1).

Figure 11B:
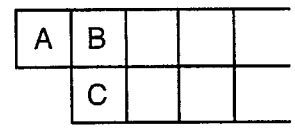
FIG. 11(b) shows a two-pixel horizontal line illustrating use of index pixels for thinning.
Figure 12B:
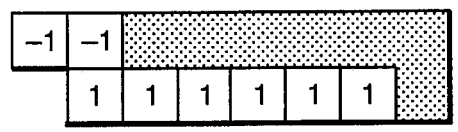
FIG. 12(b) illustrates the result of processing the line of FIG. 11(b) with index pixels.

FIGS. 11(b) and 12(b) illustrates an application of conditions a-i) and a-v). The configuration of FIG. 11(b) is two-pixel horizontal line with the addition of a pixel A to the upper left end. Pixel A would not satisfy conditions as an endpoint and would be converted as a boundary pixel having right neighbors B and C. Pixel B and other pixels of the top line would be deleted as boundary pixels having lower neighbors. When the method advances to process the lower line, the left pixel B would be converted to the background density. As an endpoint, pixel B would be evaluated according to rules of parallel processing using the unconverted value of pixel A. Other pixels of the lower line would be deleted using parallel processing since each would have an upper neighbor (using unconverted values of the upper line).

Using index values in accordance with the present invention, the configuration of FIG. 11(b) is thinned to a one-pixel line. Pixel A satisfies condition a-i) and is given an index value. Pixel B satisfies condition a-v) and is also given an index value. Processing continues similarly to the configuration in FIG. 10(b). A one-pixel vertical line is retained as show in FIG. 12(a) with retained configuration pixels marked with the configuration density (1).

The use of index pixels in accordance with the present invention has been illustrated for images processed in raster scan order. Conditions a-i) through a-v) can be generalized for use with images scanned in other orders as conditions b-i) through b-v) respectively:

b-i) The current pixel is given an index density when:
  the preceding pixel of the current scan line is a background pixel; and
  the pixel corresponding to the current pixel on the previous scan line is a background pixel.

b-ii) A center pixel (A) retains its configuration density when:
  the current pixel is not processed according to condition b-i);
  the pixel corresponding to the current pixel on the previous scan line is an index pixel after processing;
  the pixel corresponding to the current pixel on the following scan line is a background pixel;

b-iii) A current pixel retains its configuration density when:
  the current pixel is not processed according to conditions b-i) or b-ii);
  the preceding pixel of the current scan line is an index pixel; and
  the following pixel of the current scan line is a background pixel.

b-iv) A current pixel is converted to an index density when:
  the current pixel is not processed according to conditions b-i) through b-iii);
  the pixel corresponding to the current pixel on the previous scan line is an index pixel after processing; and
  the pixel preceding the pixel which corresponds to the current pixel on the previous scan is a background pixel; and
  the pixel following the pixel which corresponds to the current pixel on the previous scan is a background pixel.

b-v) A current pixel is converted to an index density when:
  the current pixel is not processed according to conditions b-i) through b-iv);
  the preceding pixel of the current scan line is an index pixel;
  the pixel preceding the pixel which corresponds to the current pixel on the previous scan is a background pixel; and
  the pixel preceding the pixel which corresponds to the current pixel on the following scan is a background pixel.
  the preceding pixel of the current scan line is an index pixel;
  the pixel preceding the pixel which corresponds to the current pixel on the previous scan is a background pixel; and
  the pixel preceding the pixel which corresponds to the current pixel on the The processes according to rules a-i to a-v are described, hereinafter, referring to FIGS. 10 to 12.

The configuration in FIG. 10(a) is a two-pixel vertical line and is to be processed by the rules a-i and a-iii. First, the upper left end pixel is processed to be given an index density, such as "−1", according to the rule a-i. The right neighbor of the first pixel is processed to be maintained as it is, according to the rule a-iii. Therefore, the vertical two-pixel line is processed in thinning to be a one pixel line consisting of the right side pixels except for the bottom pixel.

The configuration in FIG. 10(b) is a two-pixel horizontal line and is to be processed by the rules a-i and a-ii. First the upper left end pixel is processed to be given an index density, such as "–1", according to the rule a-i. The pixels on the upper line are deleted except for the left end pixel above. On the lower line, the left end pixel remains as it is according to the rule a-ii. The pixels other than the left end pixel remain as they are. Therefore, the pixels on the lower line remain except for the right end pixel.

The configuration in FIG. 11(a) consists of a two-pixel vertical line and a pixel A attached to the upper left end pixel of the two-pixel line. If the rules above are not applied to this configuration, the pixel A is deleted because the pixel is not an end point, having lower neighbors B and C. On processing the two-pixel line, the left end pixel B is deleted because the upper neighbor A is deemed to exist. The pixel C and other pixels are deleted due to parallel processing. Finally, the total configuration is deleted.

To prevent this deletion, the pixel A is given an index density according to the rule a-i, the pixel B is also given the index density according to the rule a-iv. By this processing, the configuration is processed to be a one pixel line consisting of right side pixels except for the right bottom pixel.

A configuration consisting of a two-pixel vertical line and a pixel attached to the upper right end pixel of the line can be processed similarly to the above.

The configuration of FIG. 11(b) consists of a horizontal two-pixel line and one pixel A attached from leftward to the upper leftend pixel of the line. If the rules above are not applied to this configuration, the pixel A is deleted because the pixel is not an end pixel, having right neighbors B and C. On processing the two-pixel line, the pixel B is deleted because the left neighbor is deemed to exist. Then the total pixels on the upper line are deleted. As for the lower line, the left end pixel C is deleted because the upper left neighbor A is deemed to exist. Then all pixels on the lower line are deleted. So the two-pixel line is at last completely deleted.

To prevent this deletion, the pixel A is given an index density according to the rule a-i, as shown in FIG. 12(b). The pixel B is also given an index density. Therefore, the configuration is processed in thinning to be a configuration consisting of a lower one-pixel line except for the right end pixel.

As mentioned above, since a two-pixel line is thinned to be a one-pixel line without generating a spike, the thinning performance is excellent. The process speed is high because one boundary layer is processed in on process cycle.

In the embodiment above, one group in a binary image is processed. In the labeled image, each group can be independently processed or one of the groups can be selectively processed.

What is claimed is:

1. A method for thinning a line in an image comprising steps of:

acquiring a microscopic image of a material sample in the form of image pixel density values, said image containing a configuration of pixels having configuration densities and also containing background pixels having background densities;

selecting a first neighborhood of pixels which includes a first center pixel to be processed;

replacing the density of the first center pixel with an index density when the first center pixel is a boundary pixel and the densities of the first array of pixels satisfy one of a set of conditions;

selecting a second neighborhood of pixels which includes a second center pixel to be processed, the densities of pixels in said second neighborhood including the index density of the first center pixel;

selectively retaining or replacing the density value of the second center pixel when i) the second center pixel is a boundary pixel, and ii) the densities of the second neighborhood of pixels include an index density; and generating a processed image which includes the selectively converted or retained density value of the second center pixel.

2. A method as in claim 1 wherein the step of generating a processed image includes steps of:

converting the index density of the first center pixel to a background density; and generating a processed image which includes the background density of the first center pixel.

3. A method according to claim 1 wherein the steps of selecting a first and second neighborhoods of pixels selects center pixels in an order of a series of scan lines, each scan line comprising an ordered series of pixels, and wherein each pixel in an ordered series of a scan line has a corresponding pixel in an ordered series of adjacent scan lines.

4. An image processing method according to claim 3, wherein the step of replacing the density of a first center pixel includes a step of replacing the density of the first center pixel with an index density when:

the first center pixel has a configuration density;

a pixel immediately preceding the first center pixel in the same scan line as the first center pixel has a background density; and a pixel corresponding to the first center pixel on the previous scan line from the first center pixel has a background density.

5. An image processing method according to claim 3, wherein the step of selectively retaining or replacing the density value of a second center pixel includes a step of retaining the density of the second center pixel when:

the second center pixel has a configuration density;

a pixel on the previous scan line of the second center pixel and corresponding to the second center pixel is an index pixel; and a pixel on the following scan line of the second center pixel and corresponding to the second center pixel has a background density.

6. An image processing method according to claim 3, wherein the step of selectively retaining or replacing the density value of a second center pixel includes a step of retaining the density of the second center pixel when;

a pixel immediately preceding the first center pixel in the same scan line as the first center pixel has an index density; and a pixel immediately following the first center pixel in the same scan line as the first center pixel has an index density.

7. An image processing method according to claim 3, wherein the step of replacing the density of a first center pixel includes a step of replacing the density of the first center pixel with an index density when:

a pixel on the previous scan line of the second center pixel and corresponding to the second center pixel is an index pixel;

a pixel on the previous scan line of the second center pixel and immediately preceding the pixel corresponding to the second center pixel is an index pixel; and a pixel on the previous scan line of the second center pixel and immediately following the pixel corresponding to the second center pixel is a background pixel.

8. An image processing method according to claim 3, wherein the step of selectively retaining or replacing the density value of a second center pixel includes a step of replacing the density of the second center pixel to an index density when;

a pixel immediately preceding the first center pixel in the same scan line as the first center pixel has an index density;

a pixel on the previous scan line of the second center pixel and immediately preceding the pixel corresponding to the second center pixel is a background pixel; and a pixel on the following scan line of the second center pixel and immediately preceding the pixel corresponding to the second center pixel is a background pixel.

* * * * *